(12) United States Patent
Kim et al.

(10) Patent No.: US 6,219,327 B1
(45) Date of Patent: Apr. 17, 2001

(54) OPTICAL DISK PLAYER

(75) Inventors: Young Taek Kim, Kyungki-Do; Jun Sung Lee, Suwon, both of (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 09/221,414

(22) Filed: Dec. 28, 1998

(30) Foreign Application Priority Data

Jul. 8, 1998 (KR) .............................................. P98-27424

(51) Int. Cl.[7] ...................................................... G11B 7/12
(52) U.S. Cl. .............................................................. 369/244
(58) Field of Search .................................. 369/244, 249, 369/75.1, 75.2, 77.1, 77.2, 71

(56) References Cited

U.S. PATENT DOCUMENTS

| | | | |
|---|---|---|---|
| 5,177,731 | * 1/1993 | Tanaka et al. | 369/77.1 |
| 5,245,601 | * 9/1993 | Hake | 369/72 |
| 5,268,892 | * 12/1993 | Tatsuno | 369/112 |
| 5,615,196 | * 3/1997 | Kato | 369/71 |
| 5,995,467 | * 11/1999 | Ohyama et al. | 369/71 |

FOREIGN PATENT DOCUMENTS 6274915  9/1994 (JP) .

OTHER PUBLICATIONS

Patent Abstracts of Japan of JP 06 27 4915 of Sep. 1994.

* cited by examiner

Primary Examiner—David L. Ometz
Assistant Examiner—Franklin D. Altman
(74) Attorney, Agent, or Firm—Ladas & Parry

(57) ABSTRACT

An optical disk player, used for reproducing data recorded on a laser or compact disk, is disclosed. In the disk player, a dust cover is rotatably hinged to the top surface of a pick-up unit. The above dust cover is brought into movable contact with and is operated in conjunction with the guide surface of a cam member. The dust cover thus selectively covers or opens the objective lens of the pick-up unit. Due to the dust cover, it is possible to almost completely prevent foreign substances, such as dust, from sticking on the lens, thereby effectively protecting the lens. The dust cover precisely opens or covers the lens in conjunction with a slidable movement of a guide rod of the dust cover relative to a sectioned guide surface of the cam member. The guide surface of the cam member is formed within a range corresponding to a distance between the inside edge of the chucking place of the disk to the junction between the chucking place and the data place of the disk. The optical disk player is thus free from any operational error and has an improved operational reliability.

26 Claims, 7 Drawing Sheets

OPTICAL DISK PLAYER

BACKGROUND OF THE INVENTION

1. Field of the Invention

The present invention relates, in general, to optical disk players used for reproducing data recorded on optical disks and, more particularly, to an optical disk player capable of effectively protecting an optical pick-up objective lens from foreign substances, such as dust.

2. Description of the Prior Art

As well known to those skilled in the art, optical disks, such as laser disks (LD) or compact disks (CD), have a high density data recording capacity and are almost completely and effectively used for a lengthy period of time in comparison with conventional magnetic tapes or LP records.

In order to play such optical disks and thereby to reproduce recorded data, several types of optical disk players, such as laser disk players or compact disk players, have been used. Of the known optical disk players, the compact disk players (CD players) have been more effectively, preferably and widely used since the CD players are small-sized so as to be convenient to users while carrying the disk players.

Figure 1:
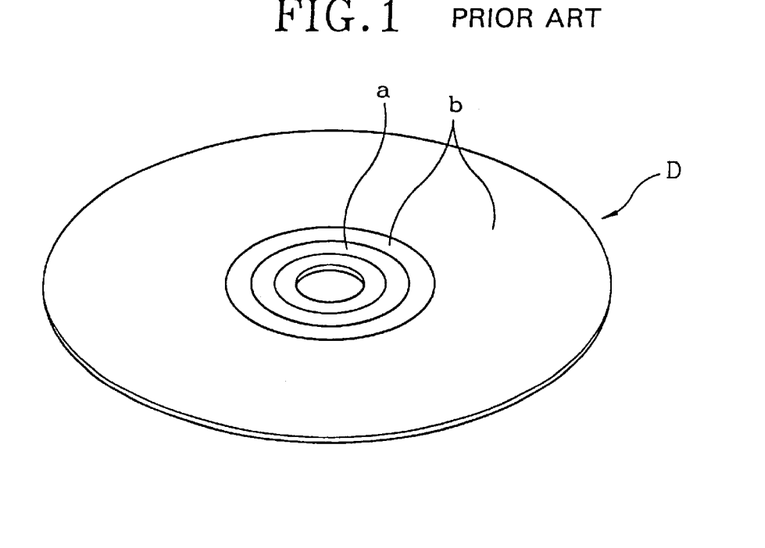
FIG. 1 is a perspective view of a conventional optical disk, showing the signal format of said disk.

The signal format for such optical disks has been typically set to a conventional CLV(constant linear velocity)-type format which has a constant linear velocity at the inside and outside circular tracts of the disk "D" as shown in FIG. 1. As shown in the drawing, the inside section of a typical optical disk "D" is divided into a chucking place "a" free from any recorded data and a data place "b" having information and data about the disk.

Figure 2:
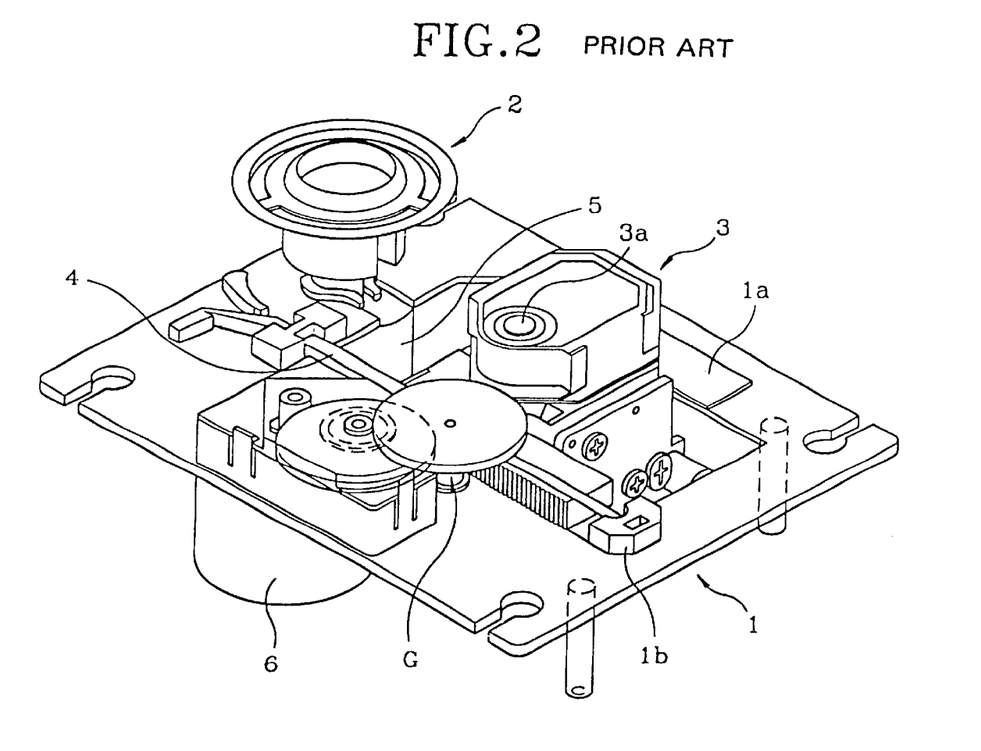
FIG. 2 is a perspective view of an optical disk player in accordance with an embodiment of the prior art.

A known optical disk player, used for operating the disks "D" having such a signal format, is shown in FIG. 2.

The disk player generally comprises three parts: a pick-up base 1, a turntable 2 and a pick-up unit 3.

In the above disk player, the pick-up base 1 is for supporting a plurality of parts of the disk player, so that it has a flat configuration. Both a guide rail 1a and a guide shaft 4 are set on the base 1 in a way such that the rail 1a is spaced apart from and parallel to said shaft 4. The above guide shaft 4 is held by a supporter 1b.

The turntable 2 or a disk drive means is set on the top surface of the pick-up base 1 and is for seating an optical disk thereon. In such a case, the disk is moved to the turntable 2 by a disk tray (not shown). The above turntable 2 is designed to be rotatable at a high speed by a spindle motor 5 arranged under the pick-up base 1.

The pick-up unit 3 is for reading the data recorded on the disk seated on the turntable 2. An objective lens 3a is set on the top wall of the pick-up unit 3 and is used for focusing a laser beam onto a desired portion of the optical disk.

The pick-up unit 3 is slidably held on the guide rail 1a at one sidewall thereof and slidably passes through the guide shaft 4 at the other sidewall. The above pick-up unit 3 is designed to be slidable in a radial direction relative to the disk while reproducing the data recorded on the disk. In such a case, the pick-up unit 3 is moved by the rotating force of a feeding motor 6, which is arranged under the pick-up base 1. The rotating force of the feeding motor 6 is transmitted to the pick-up unit 3 through a transmission gear train "G".

However, the above disk player is problematic in that the player may fail to stably or precisely read the data recorded on a disk. That is, the above optical disk player may undesirably cause an error while reading the recorded data of optical disks.

In the operation of the above disk player, an optical disk is moved from the outside to the inside of the player by a disk tray (not shown) prior to being seated on the turntable 2. However, foreign substances, such as dust, may be easily introduced into the interior of the disk player during such a disk feeding action of the tray. Such foreign substances may stick on the objective lens 3a of the pick-up unit 3, and cause the above-mentioned problem of data reading error.

That is, when foreign substances, such as dust, stick on the objective lens 3a of the pick-up unit 3, the lens 3a fails to appropriately focus a laser beam, emitted from a laser diode (not shown) of the pick-up unit 3, onto a desired point of the disk, but irregularly reflects the laser beam while reducing the optical efficiency of the pick-up unit 3 due to the foreign substances. This prevents the pick-up unit 3 from stably or effectively reproducing the data recorded on the disk.

In order to overcome the data reading error of the pick-up unit 3 due to the foreign substances, it is necessary to repeatedly clean the surface of the objective lens 3a. However, since the pick-up unit 3 is set in the housing of the optical disk player, it is very difficult for users to clean the surface of the objective lens 3a. Furthermore, some optical disk players are designed to completely prevent the users from gaining access to the objective lens 3a.

In an effort to overcome the above-mentioned problem, an optical disk player, which is designed to prevent foreign substances, such as dust, from undesirably sticking on the objective lens of the pick-up unit, is proposed as disclosed in Japanese Patent Laid-open Publication No. Heisei 6-274915.

Figure 3:
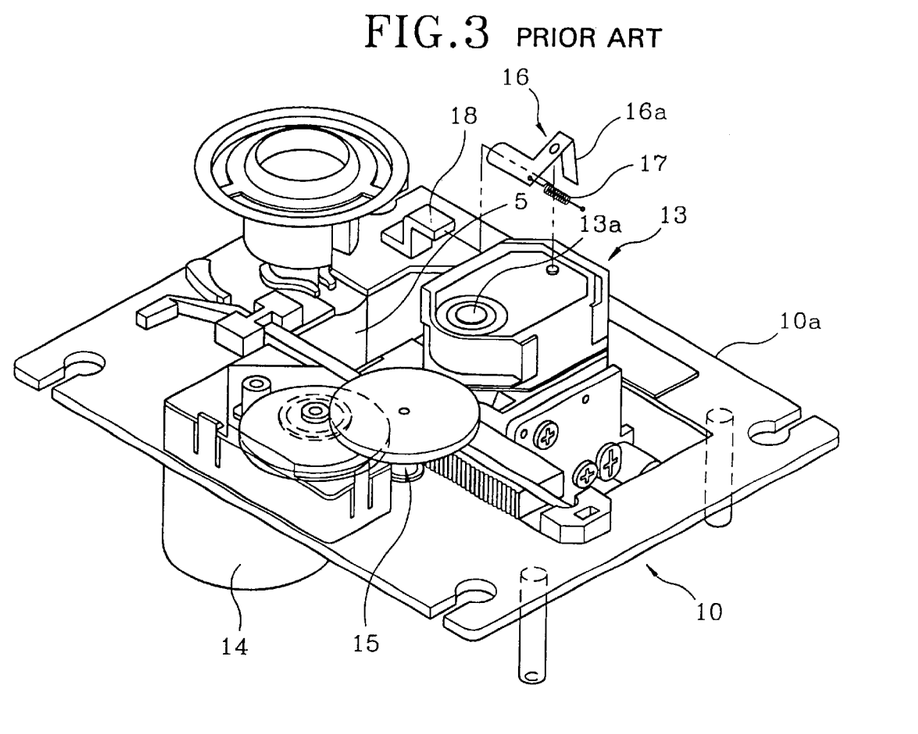
FIGS. 3 and 4 are a perspective view and a front view of an optical disk player provided with a protection member for selectively covering the objective lens of the pick-up unit in accordance with another embodiment of the prior art.
Figure 4:
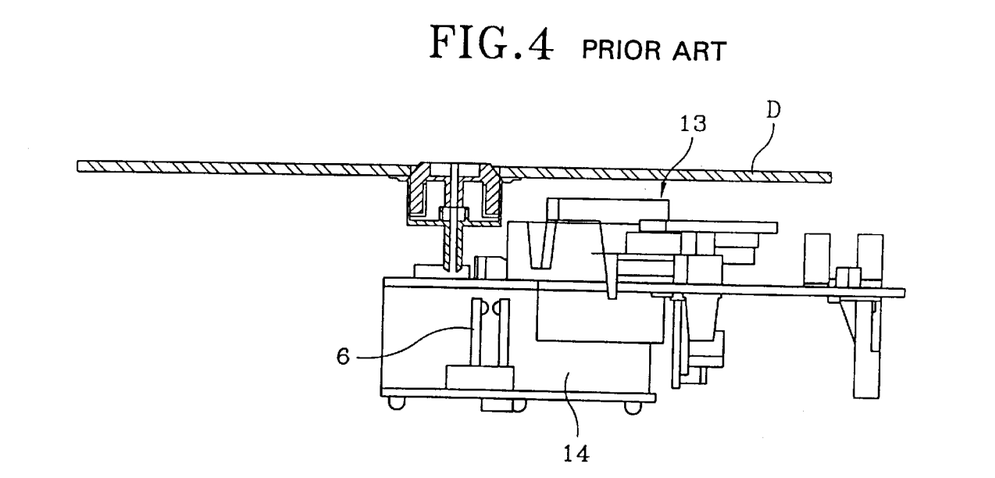

The construction of the above Japanese optical disk player is shown in FIGS. 3 and 4 of the accompanying drawings. As shown in FIGS. 3 and 4, the Japanese optical disk player 10 comprises a pick-up base 10a, a pick-up unit 13 and a pick-up drive means. In the above disk player 10, the pick-up unit 13 is slidably held on the base 10a in a way such that the unit 13 is selectively slidable in a radial direction relative to an optical disk while focusing an optical beam onto a desired point of the disk and reproducing the data recorded on said disk. The pick-up drive means, comprising a feeding motor 14 and a transmission gear train 15, moves the pick-up unit 13 in a radial direction relative to the optical disk.

In the above optical disk player 10, a protection member 16 is provided on the pick-up unit 13 for selectively covering the objective lens 13a during a stop mode of the disk player. The above protection member 16 has an extension part 16a and is normally biased counterclockwise in the drawings by a spring 17.

In the operation of the above optical disk player 10, at a time the disk player 10 is stopped and returns the pick-up unit 13 to its waiting position by the pick-up drive means 14 and 15, the extension part 16a of the protection member 16 comes into contact with a fixed stopper 18 of the base 10a, thus rotating the protection member 16 clockwise in the drawings while overcoming the biasing force of the spring 17. Therefore, the protection member 16 covers the objective lens 13a of the pick-up unit 13.

It is thus possible for the protection member 16 to prevent foreign substances, such as dust, from sticking on the objective lens 13a.

In FIGS. 3 and 4, the reference numeral 6 denotes a contact switch which is selectively brought into contact with the pick-up unit 13 so as to selectively turn on or off the motor 14 of the pick-up drive means.

The above optical disk player 10 somewhat effectively prevents foreign substances, such as dust, from sticking on the objective lens 13a of the pick-up unit 13 due to the protection member 16. However, the optical disk player 10 has a serious problem in that an operational error is generated at a time the data reproduction mode of the player 10 is started, and so the pick-up unit 13 regrettably fails to reproduce the recorded data of the disk.

The above-mentioned problem will be described in detail with reference to FIGS. 1 and 5.

Figure 5:
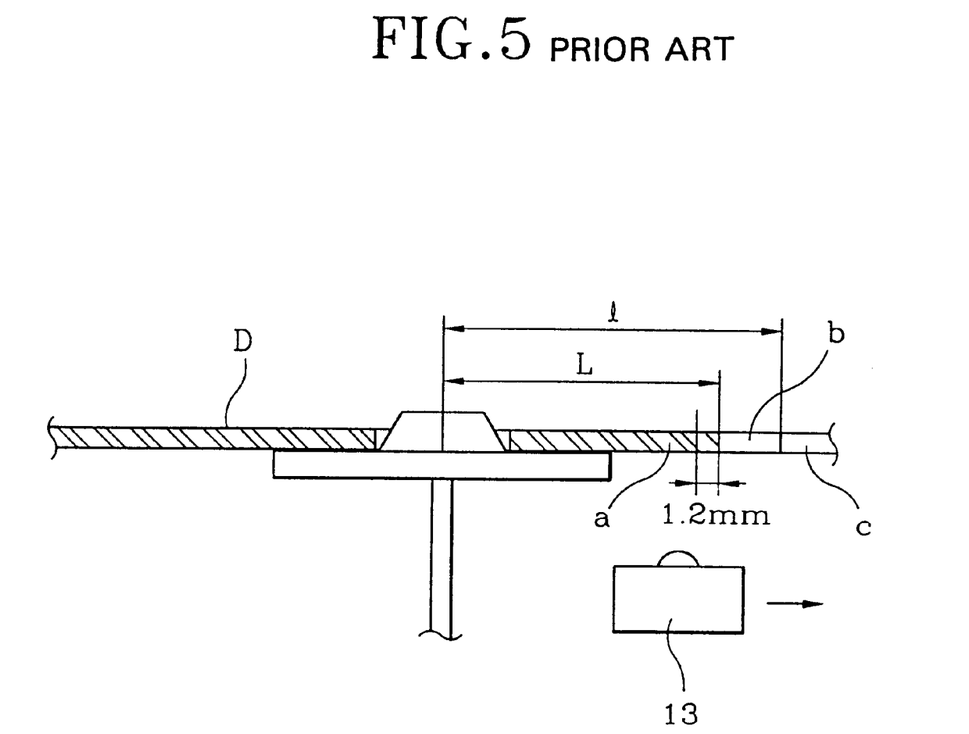
FIG. 5 is a partial front view of a known optical disk player, showing both the position of the objective lens relative to a disk and an operational problem of the known lens protection member.

As shown in FIG. 5, when letting the distance between the center of the turntable and the waiting position of the pick-up unit 13 or the outside edge of the disk's chucking place "a" be "L" and letting the distance between the center of the turntable and the outside edge of the disk's data place "b" be "l", the difference between the two distances "L" and "l" is about 2 mm.

Therefore, the protection member 16 has to cover the objective lens 13a within an operational range of about 2 mm, and so it is necessary to make the protection member 16 be rotatable prior to covering the objective lens 13a while allowing the extension part 16a of said protection member 16 to come into linear contact with the stopper 18 with a gap between the extension part 16a and the stopper 18 being limited to a range of 0.5–1 mm. However, it is almost impossible for the protection member 16, designed to come into linear contact with the lens 13a as described above, to effectively cover the objective lens 13a having an outside diameter of about 6–7 mm.

In order to effectively open the objective lens 13a by the linear contact of the extension part 16a of said lens protection member 16 with the stopper 18, it is necessary for the protection member 16 to be positioned outside the objective lens 13a.

In other words, the protection member 16 only completely opens the objective lens 13a after the lens 13a has been already positioned within the data place "b" of the disk "D".

Since the data reproduction mode is started at a time the objective lens 13a has been positioned within the data place "b" of the disk "D" as described above, the pick-up unit 13 generates a data reproduction error. This makes the pick-up unit 13 regrettably fail to appropriately and precisely reproduce the recorded data of the disk.

The above protection member 16 thus completely prevents the optical disk player from performing an appropriate data reproduction mode, and so such a protection member 16 cannot be practically used in optical disk players.

Another problem experienced in the above Japanese disk player is that the linear contact between the extension part 16a of the protection member 16 and the stopper 18 results in an interference between the extension part 16a and the stopper 18. Due to the interference, the feeding motor 14 of the pick-up drive means is overloaded, and so the motor 14 may fail to perform a desired operation.

SUMMARY OF THE INVENTION

Accordingly, the present invention has been made keeping in mind the above problems occurring in the prior art, and an object of the present invention is to provide an optical disk player, which effectively protects the objective lens of the pick-up unit from foreign substances, such as dust, while preventing any operational error during a data reproduction mode, thus stably and reliably reproducing the data recorded on a disk.

In order to accomplish the above object, the primary embodiment of this invention provides an optical disk player used for reproducing data recorded on an optical disk, the disk having a chucking place free from any recorded data and a data place having information and data about the disk, comprising: disk drive means for seating and rotating the optical disk; pick-up means provided with lens means for reproducing the data recorded on the disk; pick-up drive means for moving the pick-up means in a radial direction relative to the disk, thus allowing the pick-up means reproducing the data recorded on the disk; and lens protection means operated in conjunction with the pick-up drive means, the lens protection means during a stop mode initially covering the lens means at a time the lens means radially and inwardly passes by a junction between the chucking place and the data place of the disk, and completely covering the lens means prior to being stopped at a time the lens means has been radially and inwardly moved within the chucking place of the disk by a predetermined distance, the lens protection means during a data reproduction mode initially opening the lens means at a time the lens means moves from its waiting position on the chucking place toward the data place, and completely opening the lens means at a time the lens means reaches the junction between the two places of the disk, thus allowing the lens means to move on the data place while being completely opened.

Another embodiment of this invention provides an optical disk player used for reproducing data recorded on an optical disk, the disk having a chucking place free from any recorded data and a data place having information and data about the disk, comprising: disk drive means for seating and rotating the optical disk; pick-up means provided with lens means for reproducing the data recorded on the disk; pick-up drive means for moving the pick-up means in a radial direction relative to the disk, thus allowing the pick-up means reproducing the data recorded on the disk; lens protection means selectively covering the lens means during a stop mode or opening the lens means during a data reproduction mode; and means for controlling the lens protection means so as to allow the lens protection means during the stop mode to initially cover the lens means at a time the lens means radially and inwardly passes by a junction between the chucking place and the data place of the disk, and to completely cover the lens means prior to being stopped at a time the lens means has been radially and inwardly moved within the chucking place of the disk by a predetermined distance, the control means also controlling the lens protection means during the data reproduction mode so as to allow the lens protection means to initially open the lens means at a time the lens means moves from its waiting position on the chucking place toward the data place, and to completely open the lens means at a time the lens means reaches the junction between the two places of the disk.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

FIGS. 6 to 10 shows the construction of an optical disk player in accordance with the primary embodiment of the present invention.

As shown in the drawings, the disk player of this invention comprises a pick-up base 100 having a flat configuration.

Figure 6:
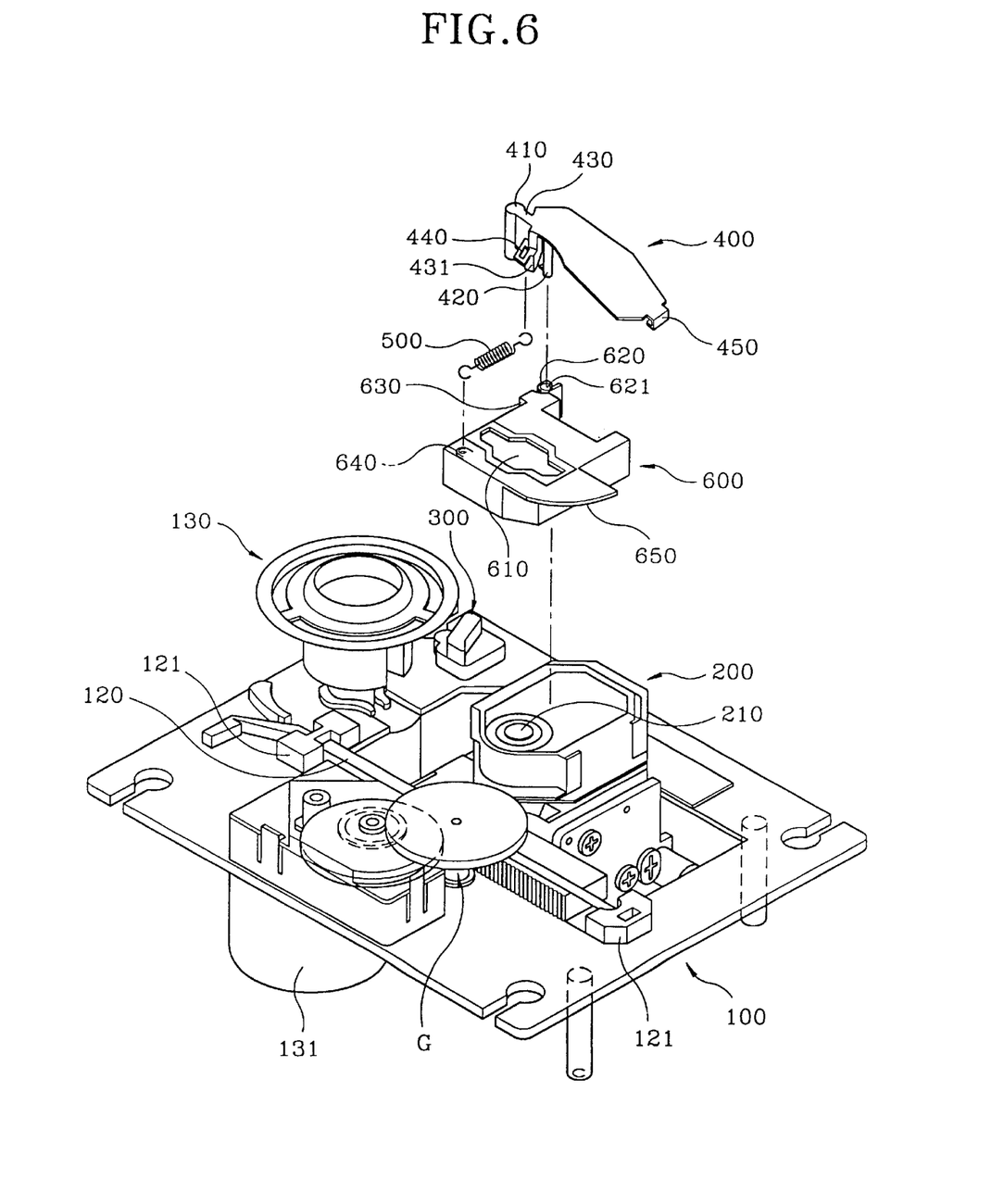
FIG. 6 is a partially exploded perspective view of an optical disk player in accordance with the primary embodiment of the present invention.
Figure 7:
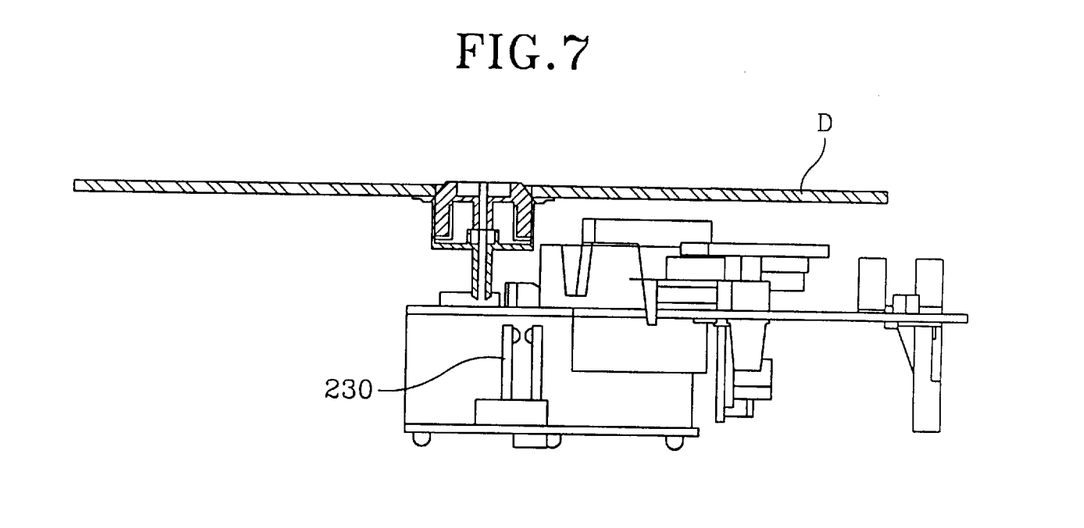
FIG. 7 is a front view of the optical disk player in accordance with this invention.

The above pick-up base 100 is for supporting a plurality of parts of the disk player. Both a guide rail 110 and a guide shaft 120 are set on the base 100 in a way such that the rail 110 is spaced apart from and parallel to said shaft 120. The above guide shaft 120 is held by a supporter 121.

A turntable 130 or a disk drive means is set on the top surface of the pick-up base 100 and is for seating and rotating an optical disk "D". The above turntable 130 is designed to be rotatable at a high speed by a spindle motor 131 arranged under the pick-up base 100.

A pick-up unit 200 is arranged on the top surface of the pick-up base 100 and is for reading the data recorded on the disk "D" seated on the turntable 130. A lens means 210 is set on the top wall of the pick-up unit 200 and is used for focusing a laser beam onto a desired portion of the optical disk "D".

The above pick-up unit 200 is slidably held on the guide rail 110 of the base 100 at one sidewall thereof and slidably passes through the guide shaft 120 at the other sidewall. The pick-up unit 200 is designed to be slidable in a radial direction relative to the disk "D" while reproducing the data recorded on the disk "D". In such a case, the pick-up unit 200 is moved by the rotating force of a pick-up drive means, which is arranged under the pick-up base 100.

In such a case, the pick-up drive means comprises a feeding motor 220, which generates a rotating force used for moving the pick-up unit 200 in a radial direction relative to the disk "D". The rotating force of the feeding motor 220 is transmitted to the pick-up unit 200 through a transmission gear train "G". The pick-up drive means also has a contact switch 230, which is selectively brought into contact with the pick-up unit 200 in accordance with a movement of the unit 200 so as to selectively turn on or off the feeding motor 220.

The optical disk "D" is seated on the turntable 130. As shown in FIG. 1, the above disk "D" has a CLV(constant linear velocity)-type signal format which has a constant linear velocity at the inside and outside circular tracts of the disk "D". As best seen FIG. 1, the inside section of the disk "D" is divided into a chucking place "a" free from any recorded data and a data place "b" having information and data about the disk "D".

The lens means 210 of the pick-up unit 200 is selectively covered with and protected by a lens protection means.

The lens protection means is designed to be operated in conjunction with the pick-up drive means as follows. That is, when selecting a stop mode of the disk player, the lens protection means initially covers the lens means 210 at a time the unit 200 passes over the junction between the two places "a" and "b" of the disk "D" during an inward movement of the unit 200 in a radial direction relative to the disk "D". Thereafter, the protection means completely covers the lens means 210 prior to being stopped at a time the lens means 210 has been radially and inwardly moved on the chucking place "a" of the disk "D" by a predetermined distance.

On the other hand, when a data reproduction mode is selected, the lens means 210 is initially opened at a time it moves from its waiting position above the chucking place "a" toward the data place "b". When the lens means 210 reaches the junction between the two places "a" and "b", the lens means 210 is completely opened. Therefore, the lens means 210 can move on the data place "b" while being completely opened.

The above lens protection means comprises a cam member 300, an external case 600, a dust cover 400 and a tension means 500.

Figure 8:
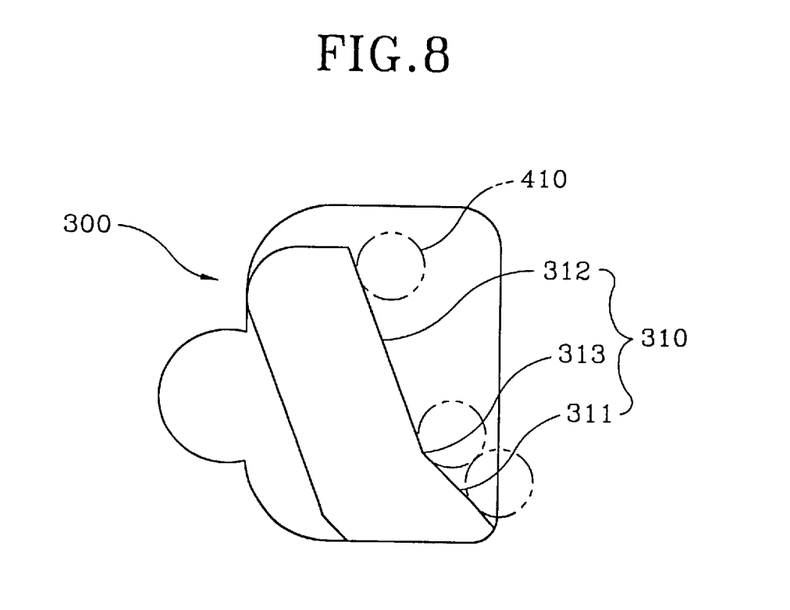
FIG. 8 is a plan view of a cam member included in the optical disk player of this invention.

The cam member 300 is placed at a position between the pick-up unit 200 and the turntable 130. The above cam member 300 has a guide surface 310 with a specifically designed cam diagram.

In the present invention, it is preferable to integrally form the cam member 300 on the top surface of the pick-up base 100 since such an integration effectively reduces the production cost and improves work efficiency while manufacturing the optical disk players.

The external case 600 is for protecting the pick-up unit 200, thus being designed to cover the external surface of said unit 200. The above case 600 has an opening 610 at its top wall so as to allow the lens means 210 of the pick-up unit 200 to be exposed to the outside of the case 600.

A boss 620 extends outwardly from the sidewall of the external case 600 to a length and has a hinge hole 621.

The dust cover 400, used for selectively covering or opening the lens means 210 of the pick-up unit 200, has a hinge shaft 420 at a side portion of the bottom surface thereof. The hinge shaft 420 rotatably engages with the hinge hole 621 of the boss 620, thus rotatably mounting the dust cover 400 to the external case 600.

The above dust cover 400 also has an extension part 430 integrated with a guide rod 410. The guide rod 410 is for being brought into movable contact with the guide surface 310 of the cam member 300 when the pick-up unit 200 moves to the turntable 130.

Therefore, the dust cover 400 selectively covers or opens the lens means 210 of the pick-up unit 200 in conjunction with a relative slidable movement of the guide rod 410 on the guide surface 310 of the cam member 300.

In order to allow the dust cover 400 to be stably rotated relative to the external case 600, a guide part 650, having a rounded edge with a curvature, is provided on the external case 600, while a guider 450 is provided on the dust cover 400. The guider 450 movably engages with the rounded edge of the guide part 650, thus guiding a rotating action of the dust cover 400 relative to the case 600.

The lens protection means selectively covers the lens means within the moving distance of the pick-up unit 200 when the pick-up unit 200 is moved from the data place "b" to the chucking place "a" of the disk "D" by the pick-up drive means. In such a case, the moving distance of the pick-up unit 200 is shorter than the diameter of the lens means 210.

That is, the moving distance of the pick-up unit 200, guided by the guide rod 410 of the dust cover 400 coming into movable contact with the guide surface 310 of the cam member 300, is equal to a distance moved from the junction between the two places "a" and "b" of the disk "D" in a direction toward the chucking place "a" by about 1.2 mm.

The dust cover 400 is normally biased counterclockwise in the drawings by the tension means 500, thus normally opening the lens means 210. The above tension means 500 is held by the external case 600 and the extension part 430 of the dust cover 400 at both ends thereof.

In order to appropriately control the biasing action of the tension means 500 for the dust cover 400, the extension part 430 of the dust cover 400 and the external case 600 respectively have stop surfaces 431 and 630 on their contact surfaces.

Due to the two stop surfaces 431 and 630, it is possible to limit the rotating range of the dust cover 400 within the area of the pick-up unit 200.

In order to hold the tension means 500, the extension part 430 of the dust cover 400 and the external case 600 for the pick-up unit 200 respectively have elastic holders 440 and 640.

It is necessary to precisely control the operation of the dust cover 400 so as to precisely cover or open the lens means 210 of the pick-up unit 200.

In order to accomplish the above precise control for the operation of the dust cover 400, the guide surface 310 of the cam member 300, which is brought into movable contact with the guide rod 410 of the dust cover 400, is sectioned into three sections as shown in FIG. 8.

That is, the guide surface 310 of the cam member 300 comprises a first guide section 311 which guides the guide rod 410 of the dust cover 400 to the junction between the two places "a" and "b" of the disk "D" when the pick-up unit 200 moves from the data place "b" to the chucking place "a" by the pick-up drive means. The above guide surface 310 also comprises a second guide section 313 which has a curvature. The above second guide section 313 forms a curve extending from a first position, where the guide rod 410 allows the dust cover 400 to initially cover or open the lens means 210, to a second position, where the guide rod 410 allows the dust cover 400 to fully cover or open the lens means 210, when the pick-up unit 200 moves between the data place "b" and the chucking place "a" of the disk "D" by the pick-up drive means.

The pick-up unit 200 is designed in that it is brought into contact with the contact switch 230 when the guide rod 410 of the dust cover 400 passes by the junction 312 between the two guide sections 311 and 313.

The operational effect of the above optical disk player will be described hereinbelow.

When selecting a stop mode after reproducing the data from the data place "b" of the disk "D" using the pick-up unit 200, the pick-up unit 200 moves from the data place "b" to the chucking place "a" of the disk "D" by the rotating force of the feeding motor 220. In such a case, the rotating force of the feeding motor 220 is transmitted to the pick-up unit 200 through the transmission gear train "G".

Figure 9:
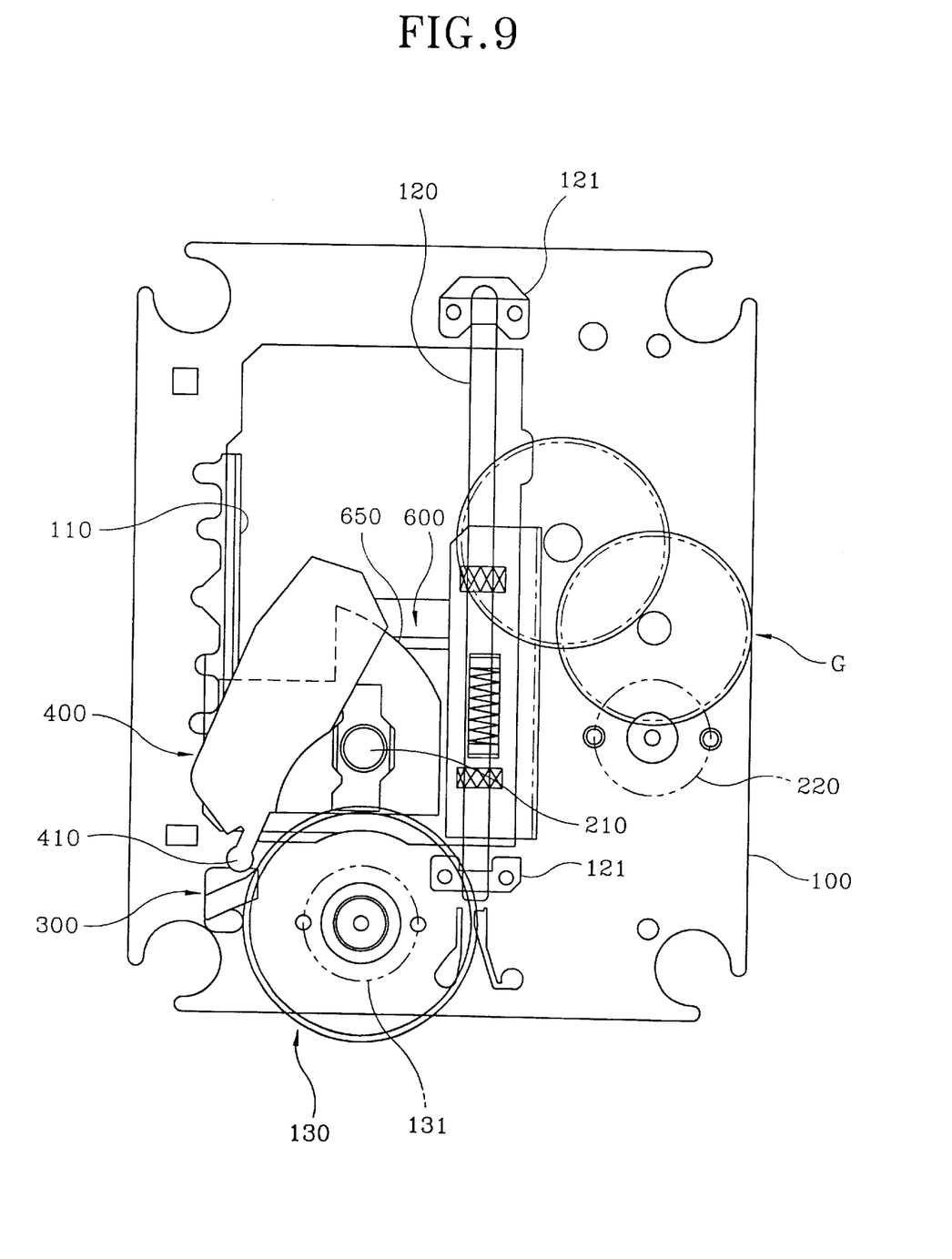
FIGS. 9 and 10 are plan views of the optical disk player according to this invention, showing the operation of the disk player.

In such a case, since the guide rod 410 of the dust cover 400 is not brought into contact with the guide surface 310 of the cam member 300 as shown in FIG. 9, the dust cover 400 is biased counterclockwise in the drawings by the tension means 500, thus opening the lens means 210 of the pick-up unit 200.

Thereafter, the pick-up unit 200 gradually moves radially and inwardly on the disk "D", while the dust cover 400, rotably hinged to the top surface of the pick-up unit 200, is brought into contact with the guide surface 310 of the cam member 300 at its guide rod 410. The dust cover 400 is thus gradually rotated clockwise in the drawings while overcoming the biasing force of the tension means 500.

In such a case, the guider 450 of the dust cover 400 movably engages with the rounded edge of the guide part 650 of the external case 600, thus stably guiding the rotating action of the dust cover 400 relative to the case 600.

That is, when the guide rod 410 of the dust cover 400 moves along the first guide section 311 of the cam member 300 as shown in FIG. 8, the dust cover 400 is slightly rotated around the hinged joint between the cover 400 and the external case 600, thus being placed at a position around the lens means 210. In such a case, the pick-up unit 200 has been moved to the outside edge of the chucking place "a" of the disk "D".

When the pick-up unit 200 is further moved inwardly relative to the disk "D", the unit 200 comes into contact with the contact switch 230 of the feeding motor 220. This means that the unit 200 passes by the outside edge of the chucking place "a" of the disk "D" prior to being moved into said chucking place "a". In such a case, a signal is output from the contact switch 230. Thereafter, the pick-up unit 200 is further moved in the same direction under the guide of the guide section 313 of the cam member 300, thus reaching a position on the chucking place "a" which is spaced apart from the outside edge of said chucking place "a" by 1.2 mm.

Figure 10:
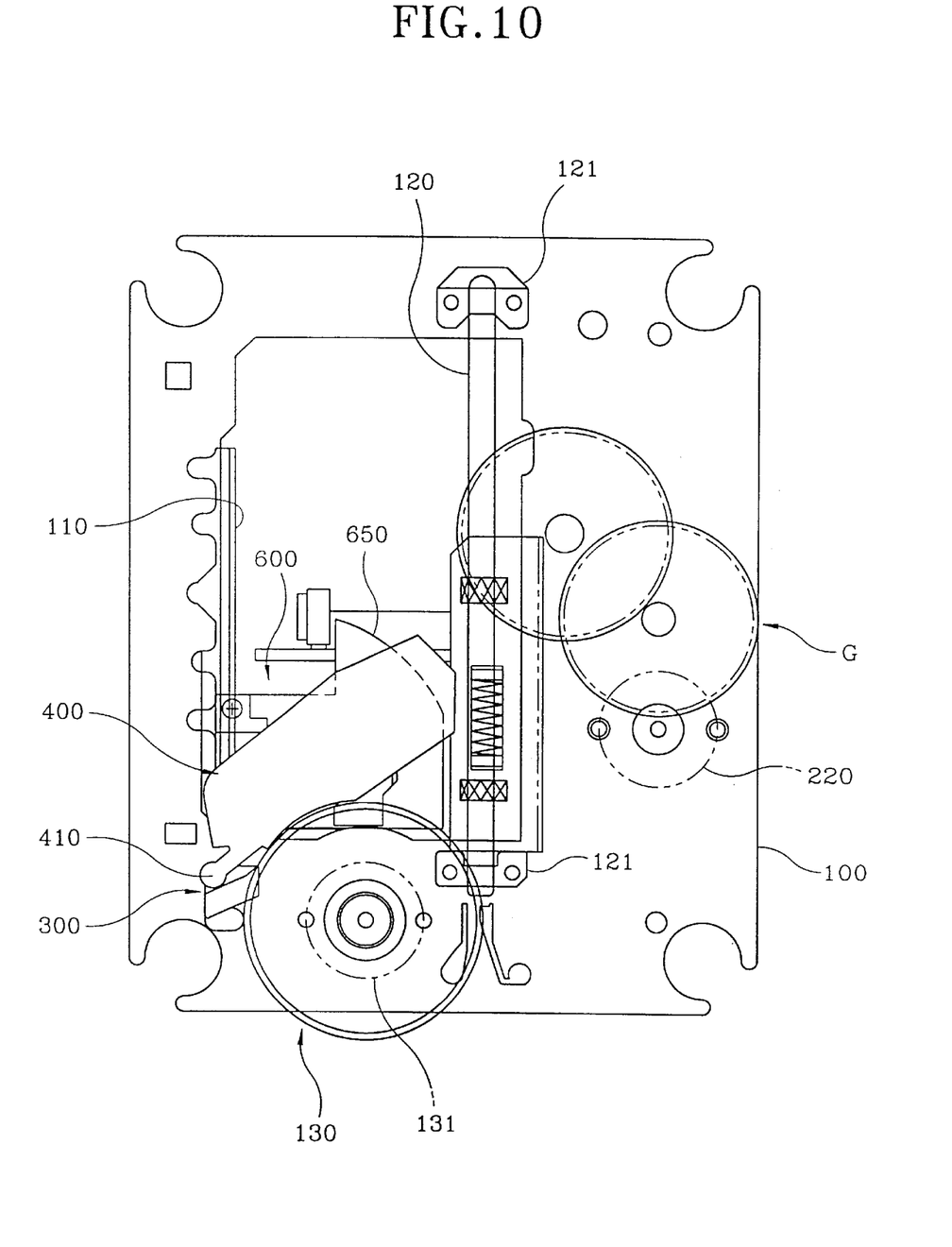

Therefore, the dust cover 400 fully covers the lens means 210 of the pick-up unit 200 as shown in FIG. 10, thus almost completely preventing foreign substances, such as dust, from sticking on the lens means 210 and thereby effectively protecting said lens means 210 from the foreign substances.

When selecting a data reproduction mode, the pick-up unit 200 moves outwardly from the chucking place "a" to the data place "b" of the disk "D" by the rotating force of the feeding motor 220.

In such a case, the guide rod 410 of the dust cover 400, which is rotatably hinged to the external case 600, moves along the guide surface 310 of the cam member 300 in the order of the second guide section 313, the junction 312 and the first guide section 311 in conjunction with the movement of the pick-up unit 200.

When the guide rod 410 of the dust cover 400 moves along the guide surface 310 of the cam member 300 as described above, the dust cover 400 is gradually rotated counterclockwise in the drawings by the restoring force of the tension means 500, thus starting to open the lens means 210 of the pick-up unit 200. The dust cover 400 is fully rotated counterclockwise in the drawings when the guide rod 410 passes by the junction 312 between the two guide sections 311 and 313.

In such a case, since the stop surface 431 of the extension part 430 of said dust cover 400 comes into contact with the stop surface 630 of the external case 600 during the rotating action of the dust cover 400, it is possible to limit the rotating range of said dust cover 400 relative to the pick-up unit 200.

Therefore, the pick-up unit 200 effectively and stably reproduces data recorded on the data place "b" of the disk "D" using the lens means 210 free from the dust cover 400.

Hereinbelow, an optical disk player according to the second embodiment of this invention will be described.

In accordance with the second embodiment of this invention, the general shape of the disk player remains the same as that described for the primary embodiment, but the cam member is not included in the lens protection means, but is included in a control means for the lens protection means different from the primary embodiment. That is, the disk player of the second embodiment comprises a pick-up base 100 having a flat configuration.

The above pick-up base 100 is for supporting a plurality of parts of the disk player. Both a guide rail 110 and a guide shaft 120 are set on the base 100 in a way such that the rail 110 is spaced apart from and parallel to said shaft 120. The above guide shaft 120 is held by a supporter 121.

A turntable 130 or a disk drive means is set on the top surface of the pick-up base 100 and is for seating and rotating an optical disk "D". The above turntable 130 is designed to be rotatable at a high speed by a spindle motor 131 arranged under the pick-up base 100.

A pick-up unit 200 is arranged on the top surface of the pick-up base 100 and is for reading the data recorded on the disk "D" seated on the turntable 130. A lens means 210 is set on the top wall of the pick-up unit 200 and is used for focusing a laser beam onto a desired portion of the optical disk "D".

The above pick-up unit 200 is slidably held on the guide rail 110 of the base 100 at one sidewall thereof and slidably passes through the guide shaft 120 at the other sidewall. The pick-up unit 200 is designed to be slidable in a radial direction relative to the disk "D" while reproducing the data recorded on the disk "D". In such a case, the pick-up unit 200 is moved by the rotating force of a pick-up drive means, which is arranged under the pick-up base 100.

In such a case, the pick-up drive means comprises a feeding motor 220, which generates a rotating force used for moving the pick-up unit 200 in a radial direction relative to the disk "D". The rotating force of the feeding motor 220 is transmitted to the pick-up unit 200 through a transmission gear train "G". The pick-up drive means also has a contact switch 230, which is selectively brought into contact with the pick-up unit 200 in accordance with a movement of the unit 200 so as to selectively turn on or off the feeding motor 220.

The optical disk "D" is seated on the turntable 130. As shown in FIG. 1, the above disk "D" has a CLV(constant linear velocity)-type signal format which has a constant linear velocity at the inside and outside circular tracts of the disk "D". As best seen FIG. 1, the inside section of the disk "D" is divided into a chucking place "a" free from any recorded data and a data place "b" having information and data about the disk "D".

The lens means 210 of the pick-up unit 200 is selectively covered with and protected by a lens protection means. The lens protection means is controlled by a control means so as to selectively cover the lens means 210 during a stop mode or open the lens means 210 during a data reproduction mode.

The above control means controls the operation of the lens protection means in conjunction with the pick-up drive means as follows. That is, when the stop mode of the disk player is selected, thus allowing the pick-up unit 200 to move from the data place "b" to the chucking place "a" of the disk "D", the control means allows the lens protection means to initially cover the lens means 210 at a time the unit 200 passes by the junction between the two places "a" and "b" during such an inward movement of the unit 200 in a radial direction relative to the disk "D". Thereafter, the protection means completely covers the lens means 210 prior to being stopped at a time the lens means 210 has been radially and inwardly moved within the chucking place "a" of the disk "D" by a predetermined distance. On the other hand, when the data reproduction mode is selected, thus allowing the pick-up unit 200 to move from the chucking place "a" to the data place "b" of the disk "D", the lens means 210 is initially opened at a time it moves from its waiting position above the chucking place "a" toward the data place "b". When the lens means 210 reaches the junction between the two places "a" and "b", the lens means 210 is completely opened. Therefore, the lens means 210 can move on the data place "b" while being completely opened.

The above control means for the lens protection means comprises a cam member 300, which has a guide surface 310 with a specifically designed cam diagram. The above guide surface 310 of the cam member 300 is operated in conjunction with the lens protection means, thus operating said lens protection means.

The guide surface 310 of the cam member 300 comprises a first guide section 311 which guides the lens protection means to the junction between the two places "a" and "b" of the disk "D", thus allowing the lens protection means to gradually cover lens means 210 when the pick-up unit 200 moves from the data place "b" to the chucking place "a" by the pick-up drive means. The above guide surface 310 also comprises a second guide section 313 which guides the lens protection means to the junction between the two places "a" and "b" of the disk "D" while allowing the lens protection means to open the lens means 210 when the pick-up unit 200 moves from the chucking place "a" to the data place "b" of the disk "D" by the pick-up drive means.

The two guide sections 311 and 313 are interfaced with each other at a predetermined angle. It is preferable to set the angle between the two guide sections 311 and 313 to an obtuse angle ranging from 90° to 180°.

In such a case, the junction 312 between the two guide sections 311 and 313 is a reference point where the pick-up unit 200 is brought into contact with the contact switch 230.

The above lens protection means comprises an external case 600, a dust cover 400 and a tension means 500.

The external case 600 is for protecting the external surface of the pick-up unit 200, thus being designed to effectively cover the external surface of said unit 200. The above case 600 has an opening 610 at its top wall so as to allow the lens means 210 of the pick-up unit 200 to be exposed to the outside of the case 600.

A boss 620 extends outwardly from the side wall of the external case 600 to a length and has a hinge hole 621.

The dust cover 400, used for selectively covering or opening the lens means 210 of the pick-up unit 200, has a hinge shaft 420 at a side portion of the bottom surface thereof. The hinge shaft 420 rotatably engages with the hinge hole 621 of the boss 620, thus rotatably mounting the dust cover 400 to the external case 600.

The above dust cover 400 also has an extension part 430 integrated with a guide rod 410. The guide rod 410 is for being brought into movable contact with the guide surface 310 of the cam member 300 when the pick-up unit 200 moves to the turntable 130.

Therefore, the dust cover 400 selectively covers or opens the lens means 210 of the pick-up unit 200 in conjunction with a relative slidable movement of the guide rod 410 on the guide surface 310 of the cam member 300.

In order to allow the dust cover 400 to be stably rotated relative to the external case 600, a guide part 650, having a rounded edge with a curvature, is provided on the external case 600, while a guider 450 is provided on the dust cover 400. The u-shaped guider 450 movably engages with the rounded edge of the guide part 650, thus guiding parallelly and perpendicularly a rotating action of the dust cover 400 relative to the case 600.

The lens protection means selectively covers the lens means within the moving distance of the pick-up unit 200 when the pick-up unit 200 is moved from the data place "b" to the chucking place "a" of the disk "D" by the pick-up drive means. In such a case, the moving distance of the pick-up unit 200 is shorter than the diameter of the lens means 210.

That is, the moving distance of the pick-up unit 200, guided by the guide rod 410 of the dust cover 400 coming into movable contact with the guide surface 310 of the cam member 300, is equal to a distance moved from the junction between the two places "a" and "b" of the disk "D" in a direction toward the chucking place "a" by about 1.2 mm.

The dust cover 400 is normally biased counterclockwise in the drawings by the tension means 500, thus normally opening the lens means 210. The above tension means 500 is held by the external case 600 and the extension part 430 of the dust cover 400 at both ends thereof.

In order to appropriately control the biasing action of the tension means 500 for the dust cover 400, the extension part 430 of the dust cover 400 and the external case 600 respectively have stop surfaces 431 and 630 on their contact surfaces.

Due to the stop surfaces 431 and 630, it is possible to limit the rotating range of the dust cover 400 within the area of the pick-up unit 200.

In order to hold the tension means 500, the extension part 430 of the dust cover 400 and the external case 600 of the pick-up unit 200 respectively have elastic holders 440 and 640.

The optical disk player according to the second embodiment is operated in the same manner as that described for the primary embodiment.

That is, when selecting a stop mode after reproducing the data of the disk "D" using the pick-up unit 200, the pick-up unit 200 moves from the data place "b" to the chucking place "a" of the disk "D" by the rotating force of the feeding motor 220. In such a case, the rotating force of the feeding motor 220 is transmitted to the pick-up unit 200 through the transmission gear train "G".

In such a case, since the guide rod 410 of the dust cover 400 is not brought into contact with the guide surface 310 of the cam member 300 as shown in FIG. 9, the dust cover 400 is biased counterclockwise in the drawings by the tension means 500, thus opening the lens means 210 of the pick-up unit 200.

Thereafter, the pick-up unit 200 gradually moves inwardly on the disk "D", while the dust cover 400, which is rotatably hinged to the top surface of the pick-up unit 200, is brought into contact with the guide surface 310 of the cam member 300 at its guide rod 410. The dust cover 400 is thus gradually rotated clockwise in the drawings while overcoming the biasing force of the tension means 500.

In such a case, the guider 450 of the dust cover 400 movably engages with the rounded edge of the guide part 650 of the external case 600, thus stably guiding the rotating action of the dust cover 400 relative to the case 600.

That is, when the guide rod 410 of the dust cover 400 moves along the first guide section 311 of the cam member 300 as shown in FIG. 8, the dust cover 400 is slightly rotated around the hinged joint between the cover 400 and the external case 600, thus being placed at a position around the lens means 210. In such a case, the pick-up unit 200 has been moved to the outside edge of the chucking place "a" of the disk "D".

When the pick-up unit 200 is further moved inwardly relative to the disk "D", the unit 200 comes into contact with the contact switch 230 of the feeding motor 220. This means that the unit 200 passes by the outside edge of the chucking place "a" of the disk "D" prior to being moved into said chucking place a". In such a case, a signal is output from the contact switch 230. Thereafter, the pick-up unit 200 is further moved in the same direction under the guide of the guide section 313 of the cam member 300, thus reaching the position within the chucking place "a" which is spaced apart from the outside edge of said chucking place "a" by 1.2 mm.

Therefore, the dust cover 400 fully covers the lens means 210 of the pick-up unit 200 as shown in FIG. 10, thus almost completely preventing foreign substances, such as dust, from sticking on the lens means 210 and thereby effectively protecting said lens means 210.

When selecting a data reproduction mode, the pick-up unit 200 moves outwardly from the chucking place "a" to the data place "b" of the disk "D" by the rotating force of the feeding motor 220.

In such a case, the guide rod 410 of the dust cover 400, which is rotatably hinged to the external case 600, moves along the guide surface 310 of the cam member 300 in the order of the second guide section 313, the junction 312 and the first guide section 311 in conjunction with the movement of the pick-up unit 200.

When the guide rod 410 of the dust cover 400 moves along the guide surface 310 of the cam member 300 as described above, the dust cover 400 is gradually rotated counterclockwise in the drawings by the restoring force of the tension means 500, thus starting to open the lens means 210 of the pick-up unit 200. The dust cover 400 is fully rotated counterclockwise in the drawings when the guide rod 410 passes by the junction 312 between the two guide sections 311 and 313.

In such a case, since the stop surface 431 of the extension part 430 of said dust cover 400 comes into contact with the stop surface 630 of the external case 600 during the rotating action of the dust cover 400, it is possible to limit the rotating range of said dust cover 400 relative to the pick-up unit 200.

Therefore, the pick-up unit 200 effectively and stably reproduces data recorded on the data place "b" of the disk "D" using the lens means 210 free from the dust cover 400.

As described above, the present invention provides an optical disk player. In the disk player, a dust cover, rotatably hinged to the top surface of a pick-up unit, is brought into movable contact with and is operated in conjunction with the guide surface of a cam member provided on the top surface of a pick-up base, thus selectively covering or opening the lens means of the pick-up unit. The dust cover thus almost completely prevents foreign substances, such as dust, from sticking on the lens means and thereby effectively protects said lens means from such foreign substances.

In addition, the dust cover opens or covers the lens means of the pick-up unit when the guide rod of the dust cover moves along the sectioned guide surface of the cam member which is formed within a range corresponding to a distance between the inside edge of the chucking place to the junction between the chucking place and the data place of the disk. Therefore, the optical disk player of this invention is free from any operational error, thus having an improved operational reliability.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical disk player for reproducing data recorded on an optical disk, the disk having a chucking place free from any recorded data and a data place having the data recorded on the disk, the optical disk player comprising:

disk drive means for seating and rotating the disk;

pick-up means provided with lens means for reproducing the data recorded on the seated and rotated disk;

pick-up drive means for moving the pick-up means in a radial direction relative to the seating of the disk drive means, thus allowing the pick-up means to reproduce the data recorded on the seated and rotated disk; and lens protection means for operation in conjunction with the radial moving of the pick-up drive means, wherein the operation of the lens protection means during a stop mode begins covering the lens means as the lens means radially moves past a junction between the chucking place and the data place of the seated disk, and completely covering the lens means prior to being stopped at a waiting position within the chucking place of the seated disk by a predetermined distance, wherein the operation of the lens protection means during a data reproduction mode begins opening the lens means as the lens means moves from the waiting position toward the data place, and completely opening the lens means at a time the lens means reaches the junction, thus allowing the lens means to move onto the data place while being completely opened, wherein said lens protection means comprises:

a cam member arranged at a position between the pick-up means and the disk drive means and having a guide surface with a specifically designed cam diagram;

an external case covering the pick-up means so as to protect the pick-up means, the external case having an opening at its top wall so as to allow the lens means to the pick-up maens to be exposed outside the case, the external case also having a boss at its sidewall, the boss having a hinge hole;

a dust cover used for selectively covering or opening the lens means of the pick-up means, the dust cover having a hinge shaft at a side portion of a bottom surface thereof, thus rotatable engaging with the hinge hole of the boss at the hinge shaft, the dust cover also having an extension part integrated with a guide rod, the guide rod being brought into movable contact with the guide surface of the cam member, thus guiding a movement of the dust cover when the dust cover selectively covers or opens the lens means; and tension means normally biasing the dust cover in a direction capable of opening the lens means, the tension means being held at opposite ends respectively by the extension part of the dust cover and the external case, and wherein the guide surface of the cam member comprises:

a first guide section used for guiding the guide rod of the dust cover to the junction between the two places of the disk when the pick-up means moves form the data place tot he chucking place by the pick-up drive means; and a second guide section having a curvature, the second guide section forming a curve extending from a first position, where the guide rod of the dust cover allows the dust cover to initially cover or open the lens means, to a second position where the guide rod allows the dust cover to fully cover or open the lens means when the pick-up means mover between the data place and the chucking place of the disk by the pick-up drive means.

2. An optical disk player for reproducing data recorded on an optical disk, the disk having a chucking place free from any recorded data and a data place having the data recorded on the disk, the optical disk player comprising:

disk drive means for seating and rotating the disk;

pick-up means provided with lens means for reproducing the data recorded on the seated and rotated disk;

pick-up drive means for moving the pick-up means in a radial direction relative to the seating of the disk drive means, thus allowing the pick-up means to reproduce the data recorded on the seated and rotated disk; and lens protection means for operation in conjunction with the radial moving of the pick-up drive means, wherein the operation of the lens protection means during a stop mode begins covering the lens means as the lens means radially moves past a junction between the chucking place and the data place of the seated disk, and completely covering the lens means prior to being stopped at a waiting position within the chucking place of the seated disk by a predetermined distance, wherein the operation of the lens protection means during a data reproduction mode begins opening the lens means as the lens means moves from the waiting position toward the data place, and completely opening the lens means at a time the lens means reaches the junction, thus allowing the lens means to move onto the data place while being completely opened, wherein said lens protection means comprises:

a cam member arranged at a position between the pick-up means and the disk drive means and having a guide surface with a specifically designed cam diagram;

an external case covering the pick-up means so as to protect the pick-up means, the external case having an opening at its top wall so as to allow the lens means to the pick-up means to be exposed outside the case, the external case also having a boss at its sidewall, the boss having a hinge hole;

a dust cover used for selectively covering or opening the lens means of the pick-up means, the dust cover having a hinge shaft at a side portion of a bottom surface thereof, thus rotatably engaging with the hinge hole of the boss at the hinge shaft, the dust cover also having an extension part integrated with a guide rod, the guide rod being brought into movable contact with the guide surface of the cam member, thus guiding a movement of the dust cover when the dust cover selectively covers or opens the lens means; and tension means normally biasing the dust cover in a direction capable of opening the lens means, the tension means being held at opposite ends respectively by the extension part of the dust cover and the external case, and wherein a guide part, having a rounded edge with a curvature, is provided on the external case, while a guider is provided on the dust cover, the guider movably engaging with the rounded edge of the guide part, thus guiding a movement of the dust cover relative to the external case.

3. The optical disk player according to claim 1 or 2, wherein said pick-up drive means comprises:
   a feeding motor generating a rotating force used for moving the pick-up means in a radial direction relative to the disk; and
   a contact switch provided on said feeding motor and selectively brought into contact with the pick-up means during a movement of said pick-up means so as to selectively turn on or off the feeding motor.

4. The optical disk player according to claim 1 or 2, wherein said lens protection means selectively covers the lens means within a moving distance of the pick-up means when the pick-up means is moved from the data place to the chucking place of the disk by the pick-up drive means, said moving distance of the pick-up means being shorter than a diameter of the lens means.

5. The optical disk player according to claim 1 or 2, wherein a moving distance of the pick-up means, guided by the guide rod of said dust cover coming into movable contact with the guide surface of the cam member, is equal to a distance moved from the junction between the two places of the disk in a direction toward the chucking place by about 1.2 mm.

6. The optical disk player according to claim 1 or 2, wherein the extension part of the dust cover and the external case respectively have elastic holders, thus holding both ends of said tension means.

7. The optical disk player according to claim 1 or 2, wherein the extension part of the dust cover and the external case respectively have stop surfaces on their contact surfaces, thus allowing the dust cover to be rotated within an area of the pick-up means.

8. An optical disk player used for reproducing data recorded on an optical disk, the disk having a chucking place free from any recorded data and a data place having information and data about the disk, comprising:
   disk drive means for seating and rotating the optical disk;
   pick-up means provided with lens means for reproducing the data recorded on the disk;
   pick-up drive means for moving the pick-up means in a radial direction relative to the disk, thus allowing the pick-up means to reproduce the data recorded on the disk;
   lens protection means selectively covering the lens means during a stop mode or opening the lens means during a data reproduction mode; and
   means for controlling the lens protection means so as to allow the lens protection means during the stop mode to initially cover the lens means at a time the lens means radially and inwardly passes by a junction between the chucking place and the data place of the disk, and to completely cover the lens means prior to being stopped at a time the lens means has been radially and inwardly moved within the chucking place of the disk by a predetermined distance, the control means also controlling the lens protection means during the data reproduction mode so as to allow the lens protection means to initially open the lens means at a time the lens means moves from its waiting position on the chucking place toward the data place, and to completely open the lens means at a time the lens means reaches the junction between the two places of the disk,
   wherein a guide part, having a rounded edge with a curvature, is provided on the external case, while a guider is provided on the dust cover, the guider movably engaging with the rounded edge of the guide part, thus guiding a movement of the dust cover relative to the external case.

9. The optical disk player according to claim 8, wherein said control means for the lens protection means comprises;
   a cam member having a guide surface, said guide surface of the cam member being operated in conjunction with the lens protection means, thus allowing said lens protection means to selectively cover or open the lens means.

10. The optical disk player according to claim 9, wherein said guide surface of the cam member comprises:
    a first guide section used for guiding the lens protection means to the junction between the two places of the disk when the pick-up means moves from the data place to the chucking place by the pick-up drive means; and
    a second guide section used for guiding the lens protection means to the junction between the two places of the disk while allowing the lens protection means to open the lens means when the pick-up means moves from the chucking place to the data place of the disk by the pick-up drive means.

11. The optical disk player according to claim 10, wherein said two guide sections of the guide surface are interfaced with each other at a predetermined angle.

12. The optical disk player according to claim 11, wherein said angle between the two guide sections is an obtuse angle ranging from 90° to 180°.

13. The optical disk player according to claim 8, wherein said lens protection means selectively covers the lens means within a moving distance of the pick-up means when the pick-up means is moved from the data place to the chucking place of the disk by the pick-up drive means, said moving distance of the pick-up means being shorter than a diameter of the lens means.

14. The optical disk player according to claim 8, wherein said lens protection means comprises:
    an external case covering the pick-up means so as to protect said pick-up means, said external case having an opening at its top wall so as to allow the lens means of the pick-up means to be exposed outside said case, said external case also having a boss at its sidewall, said boss having a hinge hole;
    a dust cover used for selectively covering or opening the lens means of the pick-up means, said dust cover having a hinge shaft at a side portion of a bottom surface thereof, thus rotatably engaging with the hinge hole of said boss at said hinge shaft, said dust cover also having an extension part integrated with a guide rod, said guide rod being brought into movable contact with the guide surface of a cam member of the control means, thus guiding a movement of the dust cover when the dust cover selectively covers or opens the lens means; and
    tension means normally biasing the dust cover in a direction capable of opening the lens means, said tension means being held by the extension part of the dust cover and the external case at both ends thereof.

15. The optical disk player according to claim 14, wherein a moving distance of the pick-up means, guided by the guide rod of said dust cover coming into movable contact with the guide surface of the cam member, is equal to a distance moved from the junction between the two places of the disk in a direction toward the chucking place by about 1.2 mm.

16. The optical disk player according to claim 14, wherein the extension part of the dust cover and the external case respectively have elastic holders, thus holding both ends of said tension means.

17. The optical disk player according to claim 14, wherein the extension part of the dust cover and the external case respectively have stop surfaces on their contact surfaces, thus allowing the dust cover to be rotated within an area of the pick-up means.

18. The optical disk player according to claim 8, wherein said pick-up drive means comprises:
   a feeding motor generating a rotating force used for moving the pick-up means in a radial direction relative to the disk; and
   a contact switch provided on said feeding motor and selectively brought into contact with the pick-up means during a movement of said pick-up means so as to selectively turn on or off the feeding motor.

19. In an optical disk player, an improved lens protector comprising:
   a base;
   one of a cam member or a guide member on the base;
   a case on the base for holding an optical pick-up having the lens, the case having an opening so as to allow the lens to be exposed outside the case, the case also having a hinge hole;
   a dust cover for movement covering or opening the lens, the dust cover having a hinge shaft for rotatably engaging with the hinge hole, the dust cover also having an extension part integrated with the other of the cam member or guide member, the other one of the cam member or guide member being brought into movable contact with the one of the cam member or guide member for the movement covering or opening the lens;
   tension means biasing the dust cover for the movement opening the lens, the tension means being held at opposite ends respectively by the extension part and one of the case or base;
   a guide on the case having a rounded edge; and
   a guider on the dust cover, the guider movably engaging with the rounded edge of the guide for guiding the movement of the dust cover relative to the case.

20. The optical disk player according to claim 19, and further comprising a stop surface on the dust cover for stopping the biased movement.

21. The optical disk player according to claim 20, wherein the guider guides the movement of the dust cover parallel to the movement of the dust cover.

22. The optical disk player according to claim 21, wherein the guider guides the movement of the dust cover perpendicular to the movement of the dust cover.

23. The optical disk player according to claim 20, wherein the guider guides the movement of the dust cover perpendicular to the movement of the dust cover.

24. The optical disk player according to claim 19, wherein the guider guides the movement of the dust cover parallel to the movement of the dust cover.

25. The optical disk player according to claim 24, wherein the guider guides the movement of the dust cover perpendicular to the movement of the dust cover.

26. The optical disk player according to claim 19, wherein the guider guides the movement of the dust cover perpendicular to the movement of the dust cover.

* * * * *